Nov. 3, 1959  G. L. COBLE, JR., ET AL  2,911,207
VIBRATION ABSORBING APPARATUS
Filed April 11, 1956

INVENTORS
GOMER L. COBLE JR.
MANUEL A. GARCIA
BY
ATTORNEYS

United States Patent Office 2,911,207
Patented Nov. 3, 1959

2,911,207

VIBRATION ABSORBING APPARATUS

Gomer L. Coble, Jr., and Manuel A. Garcia, Camarillo, Calif.

Application April 11, 1956, Serial No. 577,623

3 Claims. (Cl. 267—1)

(Granted under Title 35, U.S. Code (1952), sec. 266)

The invention described herein may be manufactured and used by or for the Government of the United States of America for governmental purposes without the payment of any royalties thereon or therefor.

The present invention relates to a new and novel vibration absorbing apparatus and more particularly to vibration absorbing apparatus employing a plurality of alternately disposed rigid and resilient members provided with a means for selectively compressing one or more of the resilient members for varying the vibrational characteristics of the device.

The present invention is especially adapted for use in applications wherein it is desired to absorb or isolate vibrations in more than one axis and wherein it is desirable to vary the resonant frequency of the device over a wide range of frequencies in order to compensate for changes in vibrational environment. For example, in the case of delicate aircraft instruments, it may be necessary to transport the instruments by means of public transportation whereby the instruments are subjected to relatively low frequency vibrations; and the instrument may subsequently be employed in aircraft wherein it is subjected to relatively high frequency vibrations. A device according to the present invention is intended to have sufficient versatility such that it may be used for mounting such instruments both in shipping containers and in the operational environment such as an aircraft to effectively absorb or isolate the vibrations to which the instrument may be subjected. It is apparent that aircraft instruments are merely exemplary and that the present invention may be utilized in numerous applications wherein it is desired to isolate vibrations of widely varying frequencies.

Prior art vibration mounts have been designed to isolate vibrations in more than one axis, but these prior art devices are excessively complicated and bulky such that they require an excessive amount of space and do not provide sufficient reliability. In addition, such prior art devices operate effectively only in a limited frequency range and are not selectively adjustable in order to be effective in varying vibrational environments.

The present invention employs a compact arrangement of alternately disposed rigid and resilient members suitably secured to one another and so constructed and arranged as to isolate vibrations along more than one axis of the apparatus. The resilient members of the device act as springs, and means are provided for selectively compressing and maintaining compressed during operation of one or more of the resilient members of the device to effectively remove such resilient member as a spring in the apparatus thereby altering the resonant frequency of the device such that it is adapted to isolate varying frequencies of vibration.

An object of the present invention is to provide a new and novel vibration absorbing apparatus which is adapted to isolate vibrations along more than one axis.

Another object is the provision of a vibration absorbing apparatus wherein the resonant frequency may be selectively adjusted over a large range of frequencies.

A further object is to provide a vibration absorbing apparatus which is simple and inexpensive in operation, yet rugged and reliable in operation.

Other objects and many of the attendant advantages of this invention will be readily appreciated as the same becomes better understood by reference to the following detailed description when considered in connection with the accompanying drawings wherein.

Figure 1:
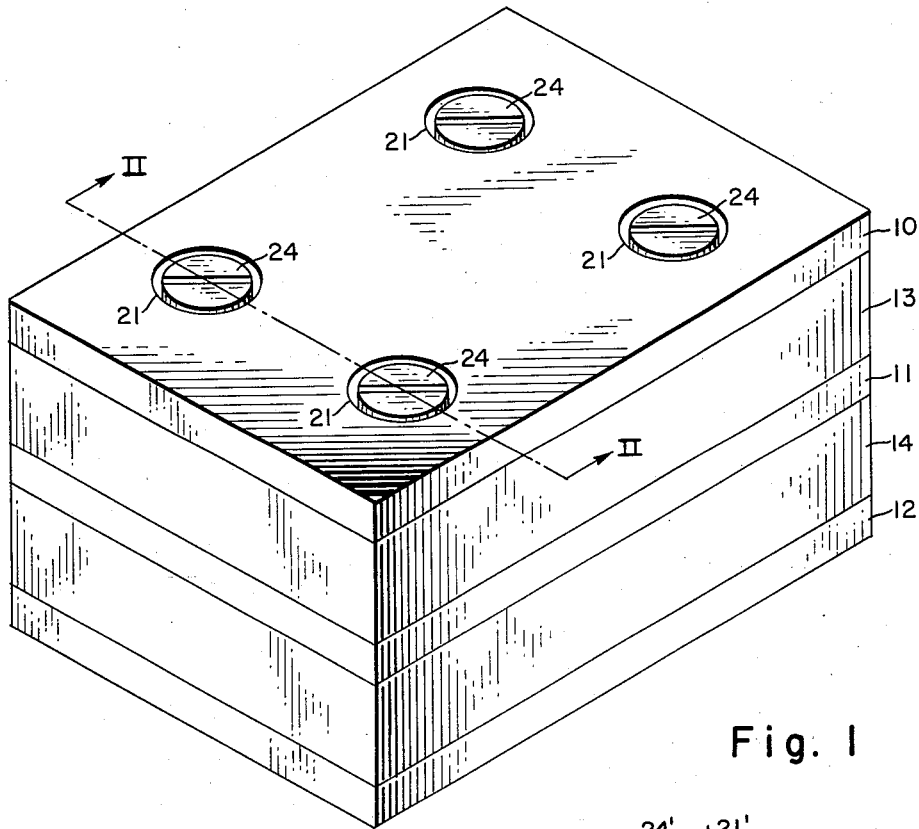
Fig. 1 is a perspective view of a vibration absorbing apparatus according to the present invention.
Figures 2, 3:
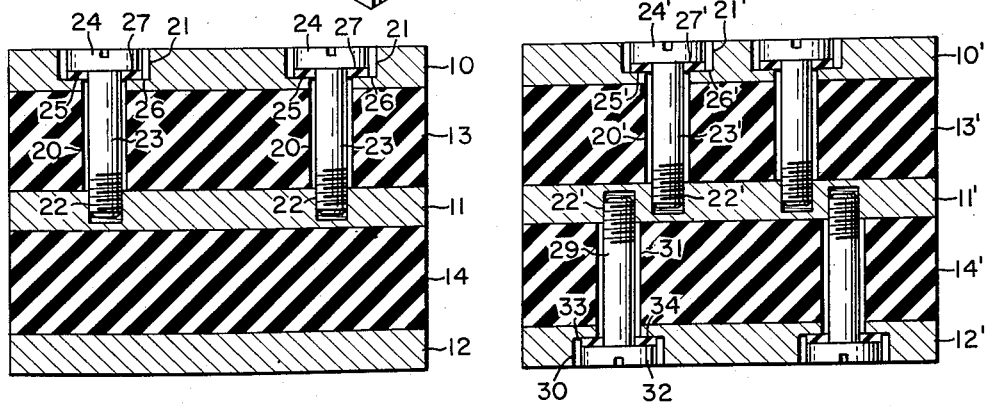
Fig. 2 is a cross-sectional view of the device shown in Fig. 1 taken along the line II—II of Fig. 1 looking in the direction of the arrows.
Fig. 3 is a view similar to Fig. 2 showing a modification of the device.

Referring now to the drawings wherein like reference characters designate similar parts throughout the several views, there is shown in Figs. 1 and 2 a vibration mount comprising three similar flattened rectangular members 10, 11 and 12 formed of a suitable substance such as aluminum which is relatively rigid. A first resilient member 13 formed of an elastic material such as rubber is disposed between rigid members 10 and 11, the upper surface of member 13 being suitably secured as by bonding to the lower surface of member 10 and the lower surface of member 13 being suitably secured as by bonding to the upper surface of member 11. A second resilient member 14 similar to member 13 is disposed between rigid members 11 and 12, the upper surface of resilient member 14 being suitably secured as by bonding to the lower surface of rigid member 11 and the lower surface of resilient member 14 being suitably secured as by bonding to the upper surface of member 12. The stiffness of resilient member 14 is substantially greater than that of resilient member 13, and the ratio of stiffness of member 14 to member 13 may be on the order of ten to one. It is apparent that the configuration of members 10—14 may be other than rectangular according to the type of installation in which it is installed.

Four symmetrically disposed cylindrical openings 20 are provided through resilient member 13, each of which is in communication with a stepped opening 21 provided in rigid member 10. Each of openings 20 also is in communication with a threaded opening 22 provided in rigid member 11. It is apparent that openings 20, 21 and 22 are axially aligned and a bolt member 23 is inserted through each of associated openings 20 and 21 and threaded into each of the associated openings 22 in rigid member 11.

It should be noted that a clearance is prvided between bolt members 23 and the inner walls of the adjacent openings 20 and 21 such that there is no direct frictional contact between bolt members 23 and members 10 or 13. Each of bolt members 23 is provided with an enlarged head portion 24, and a resilient washer 25 formed for example of rubber is disposed between and in contact with the lower surface 27 of the bolt and shoulder 26 formed in stepped openings 21, the purpose of resilient washer 25 being more fully hereinafter described.

The operation of the device disclosed in Figs. 1 and 2 is as follows:

Assuming that member 12 is fixed to a suitable supporting structure such as a packing case or the frame of an aircraft, an aicrraft instrument or other vibration sensitive mechanism may be suitably secured as by means of bolts (not shown) to member 10 in a conventional manner. If the apparatus is being transported for example by public transportation and is subjected to relatively low vibrational frequencies, bolts 23 may be tightened down thereby compressing resilient member 13 and maintaining it compressed such that resilient member 13 as a spring is effectively removed from the spring system of the device thereby providing a relatively solid connection between rigid members 10 and 11 in a direction parallel with the longitudinal axis of bolts 23. Accordingly, all the vibration isolating action is accomplished by resilient member 14, and since this member is stiffer than resilient member 13, the resonant frequency of the device is increased such that it is effective to isolate low frequency vibrations. If it should subsequently become desirable to isolate high frequency vibrations, bolts 23 may be loosened such that resilient member 13 again becomes effective, thereby reducing the resonant frequency of the apparatus such that it may efficiently isolate high frequency vibrations.

It is apparent that the apparatus is effective to isolate vibrations in a direction parallel to the longitudinal axis of bolts 23, but it is also effective to isolate vibrations along axes normal to the longitudinal axis of the bolts. This is accomplished due to the fact that a clearance is provided between bolt members 23 and members 10 and 13. The only interconnection between bolts 23 and rigid member 10 is through the intermediary of resilient washers 25 which are adapted to attenuate any lateral vibrations which would otherwise be transmitted from bolts 23 to rigid member 10 which supports the device which it is desired to isolate. Resilient member 13 isolates any lateral vibrations of rigid member 11 from rigid member 10 in a manner similar to that in which it isolates vibrations in a direction parallel to the longitudinal axes of bolts 23. It is accordingly evident that the device effectively isolates vibrations along a plurality of axes and that the effectiveness of the isolation remains constant over a wide range of frequencies due to the fact that the resonant frequency of the device may be selectively varied.

Fig. 3 illustrates a modification wherein components similar to those shown in Fig. 2 have been given the same reference numeral primed, and four additional symmetrically disposed bolts 29 are provided similar to bolts 23 of Fig. 2 whereby resilient member 14', may be compressed as well as resilient member 13'. Aligned openings 30 and 31 are provided in rigid member 12' and resilient member 14' respectively, and openings 31 are each in communication with a threaded opening 22' provided in rigid member 11'. Bolts 29 are threaded into openings 22' and are provided with an enlarged head portion 32 which is separated from shoulder 33 of stepped opening 30 by means of a resilient washer 34. A clearance is provided between bolts 29 and the inner walls of openings 30 and 31 which in cooperation with washers 34 effectively isolates lateral vibrations of rigid member 12' from rigid member 11'.

In operation of the device shown in Fig. 3, it is apparent that either of the plurality of bolts 23' or 29 may be selectively adjusted independently of one another for compressing resilient members 13' and 14' in accordance with the vibrational environment encountered. One of resilient members 13' or 14' is substantially stiffer than the other as in the modification shown in Fig. 2, but since either of the resilient members is selectively compressible in the device shown in Fig. 3, it is immaterial as to which of the resilient members is the stiffer.

Although four symmetrically disposed bolts have been shown for compressing each of the resilient members, it is apparent that any number of bolts may be employed so long as they are substantially symmetrically distributed, and a single centrally disposed bolt may be employed if desired. Furthermore, it is evident that either rigid member 10 or 12 may support an instrument or other device and the opposite rigid member may be secured to a suitable support member.

It is apparent from the foregoing that there is provided a new and novel vibration absorbing apparatus which is adapted to absorb or isolate vibrations in more than one axis and which is adjustable over a wide range of frequencies. The device is simple and inexpensive in construction, yet rigid and reliable in operation.

Obviously many modifications and variations of the present invention are possible in the light of the above teachings. It is therefore to be understood that within the scope of the appended claims the invention may be practiced otherwise than as specifically described.

We claim:

1. Vibration absorbing apparatus which comprises a first rigid member having first and second oppositely facing essentially planar surfaces, a first resilient member having first and second oppositely facing surfaces, the first surface of said first resilient member being in contact with the second surface of said first rigid member, a second rigid member having first and second oppositely facing essentially planar surfaces, the second surface of said first resilient member being in contact with the first surface of said second rigid member, a second resilient member having first and second oppositely facing surfaces, the second surface of said second rigid member being in contact with the first surface of said second resilient member, a third rigid member having first and second oppositely facing essentially planar surfaces, the second surface of said second resilient member being in contact with the first surface of said third rigid member, the stiffness of said second resilient member being greater than the stiffness of said first resilient member, said second rigid member having a plurality of threaded openings formed therein, a first plurality of bolts passing through aligned openings in said first rigid member and said first resilient member and threadably engaging certain of the threaded openings in said second rigid member, and a second plurality of bolts passing through aligned openings in said third rigid member and said second resilient member and threadably engaging other of the threaded openings in said second rigid member, whereupon selective tightening of the bolts respectively associated with said first or said third rigid member will compress said first or said second resilient member and maintain this resilient member under compression during operation of the apparatus while the remaining resilient member remains uncompressed except as a result of vibration to which said apparatus is subjected.

2. Vibration absorbing apparatus which comprises a first rigid member having first and second oppositely facing surfaces, a first resilient member having first and second oppositely facing surfaces, the first surface of said first resilient member being fixedly secured to the second surface of said first rigid member, a second rigid member having first and second oppositely facing surfaces, the second surface of said first resilient member being fixedly secured to the first surface of said second rigid member, said first rigid member and said first resilient member having first and second aligned openings formed therein respectively, said second rigid member having formed therein a first threaded opening aligned with said first and second openings, first bolt means extending through and being spaced from said first and second openings and being threaded into said first threaded opening, said first bolt means having an enlarged head formed thereon, first resilient washer means disposed between and in contact with the enlarged head of said first bolt means and said first rigid member for attenuating the transmission of vibratons therebetween, a second resilient member having first and second oppositely facing surfaces, the second surface of said second rigid member being fixedly secured to the first surface of said second resilient member, a third rigid member having first and second oppositely facing surfaces, the second surface of said second resilient member being fixedly secured to the first surface of said third rigid member, the stiffness of said second resilient member being greater than the stiffness of said first resilient member.

3. Apparatus as defined in claim 2 wherein said second resilient member and said third rigid member have third and fourth aligned openings formed therein respectively, said second rigid member having formed therein a second threaded opening aligned with said third and fourth aligned openings, second bolt means extending through and being spaced from said third and fourth openings and being threaded into said second threaded opening, said second bolt means having an enlarged head formed thereon, second resilient washer means disposed between and in contact with the enlarged head of said second bolt means and said third rigid member for attenuating the transmission of vibrations therebetween.

References Cited in the file of this patent

UNITED STATES PATENTS

| | | |
|---|---|---|
| 1,425,528 | Lind | Aug. 15, 1922 |
| 2,328,877 | Gallagher | Sept. 7, 1943 |

FOREIGN PATENTS

| | | |
|---|---|---|
| 762,631 | France | Jan. 22, 1934 |
| 782,089 | France | Mar. 11, 1935 |